US012799956B2

(12) United States Patent
Nadeau, Jr. et al.

(10) Patent No.: US 12,799,956 B2
(45) Date of Patent: Nov. 17, 2026

(54) HIGH HELIX, HIGH MASS-FLOW DEVICE AND METHOD

(71) Applicant: V-Stax, L.L.C., Fernandina Beach, FL (US)

(72) Inventors: Bruce E. Nadeau, Jr., Miami Beach, FL (US); Joseph C. Lull, South Haven, MI (US)

(73) Assignee: V-Stax, L.L.C., Fernandina Beach, FL (US)

(*) Notice: Subject to any disclaimer, the term of this patent is extended or adjusted under 35 U.S.C. 154(b) by 818 days.

(21) Appl. No.: 18/174,377

(22) Filed: Feb. 24, 2023

(65) Prior Publication Data

US 2024/0288014 A1 Aug. 29, 2024

(51) Int. Cl.
*F15D 1/02* (2006.01)

(52) U.S. Cl.
CPC .................................... *F15D 1/02* (2013.01)

(58) Field of Classification Search
CPC ..... B05B 1/265; B05B 7/0012; B05B 7/0483; B05B 7/12; F15D 1/02
USPC .............................................. 261/78.2, 79.2
See application file for complete search history.

(56) References Cited

U.S. PATENT DOCUMENTS 3,664,638 A 5/1972 Grout et al.
5,732,885 A 3/1998 Huffman
5,848,750 A * 12/1998 Schwab .................... B05B 7/10 239/432
5,868,321 A * 2/1999 Haruch ................. B05B 7/0466 239/432
6,136,272 A 10/2000 Weigl et al.
6,161,778 A * 12/2000 Haruch ................. B05B 7/0483 239/419
7,036,753 B2 * 5/2006 Huffman ............... B05B 7/0466 239/431

(Continued)

FOREIGN PATENT DOCUMENTS

CN 103291371 B 11/2016
CN 114216129 A 3/2022

(Continued)

OTHER PUBLICATIONS

Ellingsen et al. Designing Vortices in Pipe Flow with Topography-Driven Langmuir Circulation, Journal of Fluid Mechanics; Year: 2021, vol. 926. 24 pages.
"Kwerk—Static Mixer", https://www.youtube.com/watch?v=YYfUG-SdU6A&ab_channel=ThorstenHartmann; Jul. 29, 2024; video length of 1 minute 22 seconds; 3 pages.
PCT/US2024/016879 International Search Report and Written Opinion dated Jun. 18, 2024. 16 pages.

(Continued)

*Primary Examiner* — Charles S Bushey
(74) *Attorney, Agent, or Firm* — Dorsey & Whitney LLP

(57) ABSTRACT

A method of forming a gas-liquid plume includes causing a gas to flow through helical conduits, and thereby causing the gas to swirl within a funnel-shaped volume of a connection component, and causing a liquid stream to flow into the funnel-shaped volume such that the liquid is broken up into droplets and ligaments by the gas within the funnel-shaped volume. The present disclosure also relates to the use of helical conduits with quadrilateral cross-sections to provide a high mass flow-rate and a desired swirling motion within a flow device. The present disclosure also relates to a method of assembling a device for forming a gas-liquid plume, including the steps of connecting a nozzle component to a connection component and, subsequently, connecting a main component to the connection component.

13 Claims, 5 Drawing Sheets

(56) References Cited

U.S. PATENT DOCUMENTS

| | | | |
|---|---|---|---|
| 8,033,714 B2 | 10/2011 | Nishioka et al. | |
| 8,672,234 B2 | 3/2014 | Amaya et al. | |
| 9,168,545 B2 * | 10/2015 | Vidusek | B01D 47/06 |
| 9,702,254 B2 | 7/2017 | Saiz | |
| 9,879,862 B2 | 1/2018 | McCormick et al. | |
| 9,970,317 B2 | 5/2018 | Freeman et al. | |
| 9,982,643 B2 | 5/2018 | Huettner et al. | |
| 10,302,058 B2 | 5/2019 | Lull et al. | |
| 10,766,044 B2 * | 9/2020 | Yi | B05B 7/0466 |
| 10,883,454 B2 | 1/2021 | Amaya et al. | |
| 11,674,479 B2 | 6/2023 | Amaya et al. | |
| 2004/0222317 A1 | 11/2004 | Huffman | |
| 2015/0028132 A1 | 1/2015 | Vidusek et al. | |
| 2019/0107085 A1 | 4/2019 | Amaya et al. | |
| 2020/0156093 A1 | 5/2020 | Yi et al. | |

FOREIGN PATENT DOCUMENTS

| | | |
|---|---|---|
| CN | 114575976 B | 10/2023 |
| IN | 343369 | 8/2020 |
| JP | 62272896 A | 11/1987 |
| JP | S63112107 A | 5/1988 |
| KR | 101471311 B1 | 12/2014 |

OTHER PUBLICATIONS

"Helical Static Mixer Technical Bulletin—STAMIXCO.pdf", https://www.stamixco-usa.com/files/3-Content-PDF-Files/PDF-12.0)%20Helical%20Static%20Mixer%20Technical%20Bulletin.pdf; Year: 2007; 3 pages.

"KM Mixers", https://www.nov.com/; Year: 2024; 6 pages.

"KM Static Mixer", https://www.youtube.com/watch?v=IJzSp0nukLY&ab_channel=NOV; accessed Jul. 29, 2024; Video length of 18 seconds.

"Koflo P-.25-12 Disposable Static Mixer", https://www.coleparmer.com/i/koflo-p-25-12-disposable-static-mixer-1-4-dia-12-element/1466900?PubID=UX&persist=true&ip=no&gad_source=1&gclid=CjwKCAIA1MCrBhAoEiwAC2d64ed0J46rx7OhNAUauxO85btfDdR5hdBKhl_fXaQKQVjSQKJdhwnt6RoCffsQAvD_BwE; accessed Jul. 29, 2024; 2 pg.

"Kwerk—Static Mixer", https://www.kwerk.de/statische-mischer/; accessed Jul. 29, 2024; 19 pages.

"LOCTITE Epoxy Adhesive", https://www.grainger.com/product/52WX577gucid=N:N:PS:Paid:GGL:CSM-2295:4P7A1P:20501231&gad_source=1&gclid=Cj0KCQiAsburBhCIARIsAExmsu4rRGLf5BQBYW_R1H2HrRkO62xYcD7PRylpH73lm_X0v7AaoUuEzElaAgb3EALw_wcB&gclsrc=aw.ds; accessed Jul. 29, 2024; 4 pages.

"STAMIXCO—Model HT (Helical Static Mixer)", https://www.stamixco-usa.com/helical; Year: 2024; 3 pages.

* cited by examiner

HIGH HELIX, HIGH MASS-FLOW DEVICE AND METHOD

BACKGROUND

The present disclosure relates, generally, to devices for spraying, or injecting, gas-liquid plumes, methods of using such devices to form gas-liquid plumes, and methods of assembling such devices.

SUMMARY

According to one aspect of the present disclosure, a method of using a device to form a gas-liquid plume includes the steps of: causing a gas to flow at a high mass flow-rate through helical conduits within a main component, and thereby causing the gas to swirl within a funnel-shaped volume of a connection component; and causing a stream of liquid to flow into the funnel-shaped volume where the liquid is broken up into droplets and ligaments by the swirling gas.

According to this aspect of the present disclosure, the method includes causing the droplets and the ligaments, a remainder of the liquid stream, and the gas to accelerate from the funnel-shaped volume and into an annular flow volume within a nozzle component, and thereby form smaller droplets, and, subsequently, causing a mixture of the gas and the smaller droplets to accelerate from the annular flow volume and into nozzle openings, to thereby form the gas-liquid plume downstream from the nozzle component.

According to another aspect of the present disclosure, a device for forming a gas-liquid plume includes: a main component including helical conduits; a connection component having a funnel-shaped volume, connected to the main component; and a nozzle component including an annular flow volume defined by a pedestal, and downstream nozzle openings, where the nozzle component is connected to the connection component. According to this aspect of the present disclosure, the helical conduits permit gas to flow through the main component, and cause the gas to swirl within the funnel-shaped volume of the connection component. According to a preferred aspect of the present disclosure, the helical conduits have quadrilateral cross-sections, at least at their inlet openings, to permit a greater mass flow-rate of the gas through the main component, and to create a high helicity angle swirl to interact with the released liquid to create the first droplets and ligaments and also to maintain the energetic mixing and distribution of the droplets to form a highly homogeneous droplet distribution in the output of the plume. An example of a droplet distribution which may be achieved in accordance with the present disclosure is described below in connection with Example 1.

Further, according to the present disclosure, a liquid orifice releases a stream of liquid to flow into the funnel-shaped volume. Most of the liquid is broken up into first droplets and ligaments within the funnel-shaped volume. A remainder of the liquid impinges on the pedestal. The connection and nozzle components cause the droplets and the ligaments, the remainder of the liquid, and the gas to accelerate from the funnel-shaped volume and into the annular flow volume, and thereby form smaller droplets. The nozzle component then causes a mixture of the gas and the smaller droplets to accelerate into the nozzle openings to form the gas-liquid plume.

According to yet another aspect of the present disclosure, discussed in more detail below, a method of assembling a plume-forming device includes the steps of connecting a nozzle component to a connection component and, subsequently, connecting a main component to the connection component. According to this aspect of the present disclosure, the connection component is located between the main and nozzle components of the device.

BRIEF DESCRIPTION OF THE DRAWINGS

Throughout the drawings, like elements are designated by like reference numerals and other characters. The drawings show non-limiting examples for purposes of illustration and explanation of the present disclosure, and are not drawn to scale.

DETAILED DESCRIPTION

Figure 1:
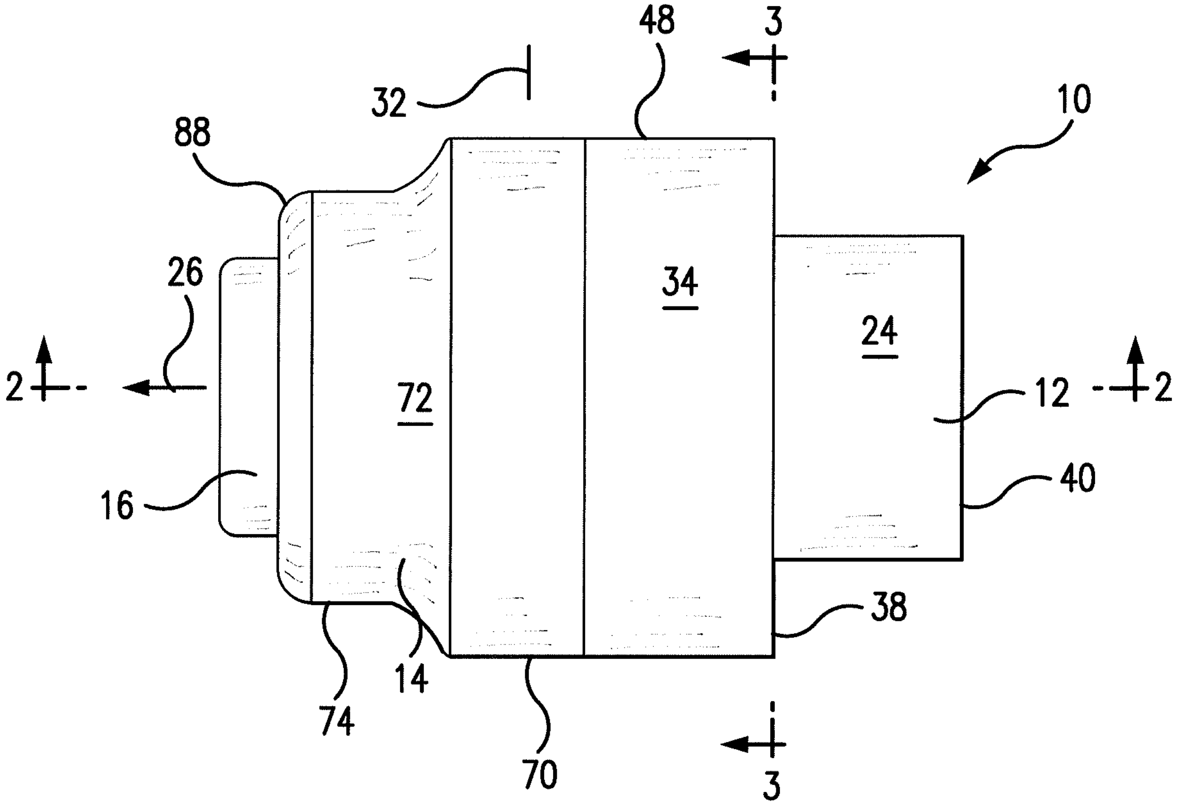
FIG. 1 is a side view of an example of a flow device constructed in accordance with the present disclosure.

Referring now to the drawings, FIG. 1 shows an example of a multi-part, composite flow device 10 constructed in accordance with the present disclosure. The flow device 10 includes a main component 12, a connection component 14, and a nozzle component 16. The main component 12 is configured to receive liquid through a suitable liquid metering device 18 (FIG. 2), and to receive pressurized gas, which may be, for example, pressurized air, from a suitable gas supply device (not illustrated). The liquid metering device 18 outputs the liquid through a suitable orifice 20.

Figure 2:
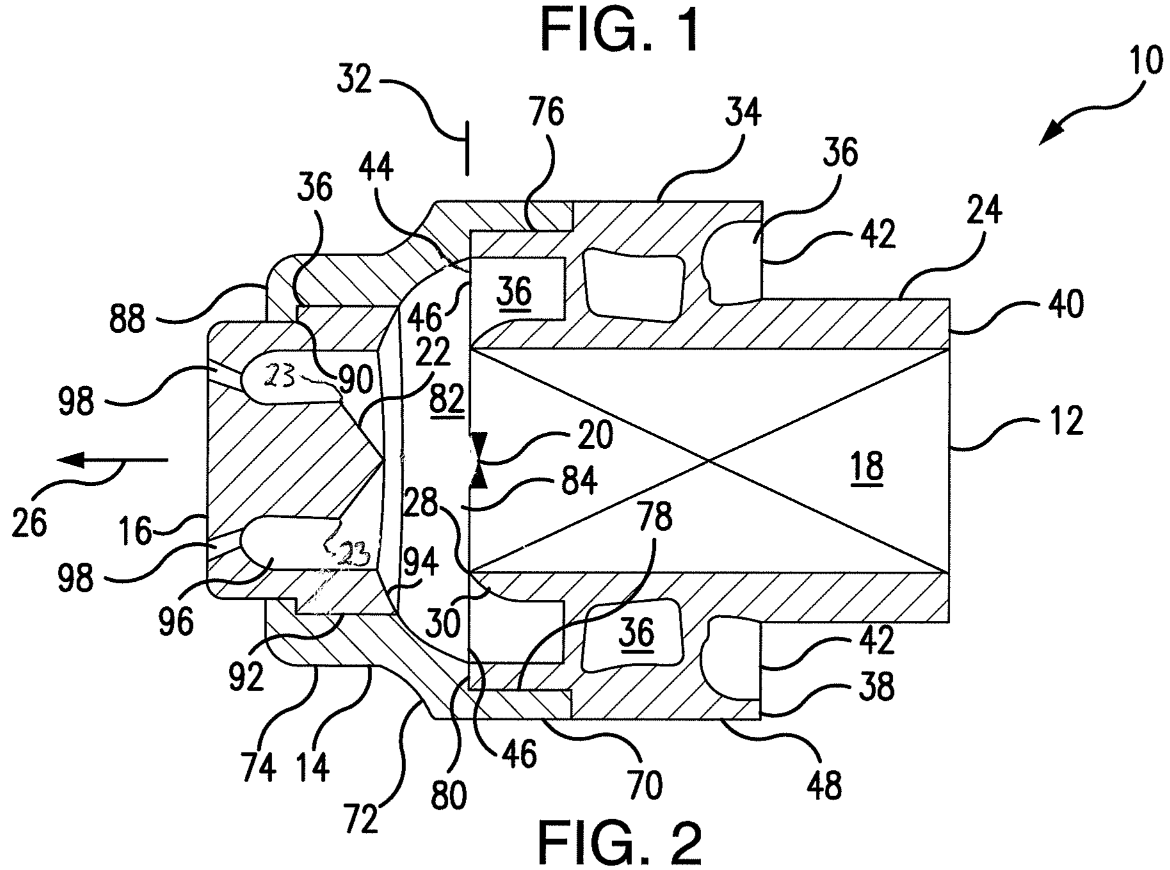
FIG. 2 is a cross-sectional view of the flow device of FIG. 1, taken along line 2-2.

The metering device 18 and the orifice 20, both of which are only schematically illustrated in FIG. 2, may be constructed as disclosed, for example, in U.S. Pat. Nos. 8,672,234 and 10,302,058. The present disclosure should not be limited, however, to the metering devices and orifices disclosed in U.S. Pat. Nos. 8,672,234 and 10,302,058. The metering device 18 and the orifice 20 issue the liquid in a narrow cylindrical stream, flowing from right to left as viewed in FIG. 2, toward a pedestal 22 (described in more detail below).

The main component 12 has a cylindrical receptor 24 for receiving the liquid metering device 18. The receptor 24 is preferably axially symmetrical about a flow axis 26. The receptor 24 has a circular front edge 28 with a beveled flow surface 30. If desired, the front edge 28 may be located entirely within a front plane 32 of the main component 12. The present disclosure should not be limited, however, to specific features shown in the drawings except to the extent such features are recited in the accompanying claims.

The main component 12 also has a gas flow housing 34 with helical (corkscrew-shaped) gas flow conduits 36. The housing 34 has a rear surface 38 located between a rear end 40 of the receptor 24 and the front plane 32 of the main component 12. The flow conduits 36 have inlet openings 42 located at the rear surface 38 of the gas flow housing 34. The housing 34 may also have a front surface 44 located entirely within the front plane 32. The flow conduits 36 have outlets 46 that may be located within the front plane 32. The outlets 46 are partially defined by the beveled flow surfaces 30 of the circular front edge 28. There may be more or fewer flow conduits 36 than are shown in the drawings. According to one aspect of the present disclosure, for example, there may be twelve flow conduits 36 arranged helically around the flow axis 26, and twelve corresponding openings 42 and outlets 46.

Figure 3:
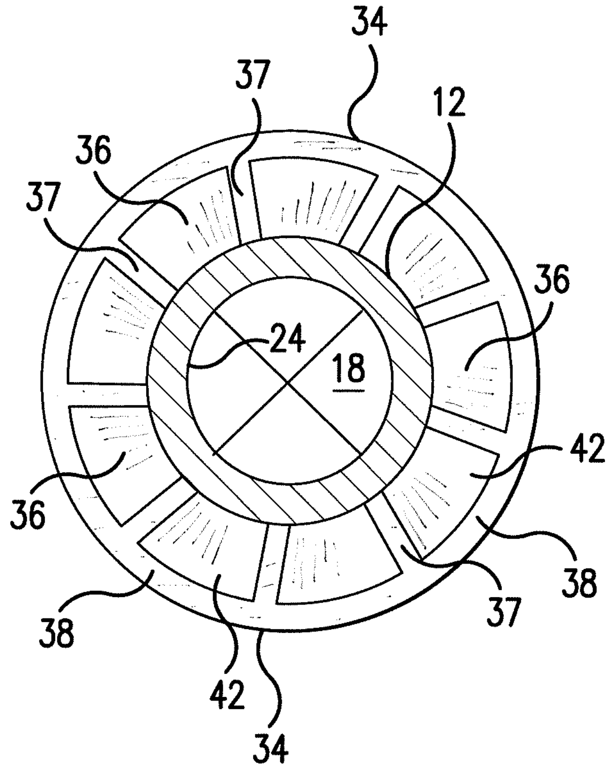
FIG. 3 is a cross-sectional view of the flow device of FIG. 1, taken along line 3-3.

A preferred configuration for each of the flow conduits 36 involves high helicity in a flow direction (around the flow axis 26), and a quadrilateral cross-section in a direction perpendicular to the flow direction. The high helicity generates a downstream swirling motion with high vorticity. The high energy of this vortex continues downstream through final ejection of the plume resulting in an even distribution of droplets and allows for round and other plume shapes to be generated; for example, a square plume shape may be generated with the benefit of the high energy of the vortex. At the same time, the quadrilateral (not circular) cross-sections of the conduits 36 provide for a high mass flow-rate through the main component 12 despite the pressure drop along the lengths of the conduits 36 created by the helicity of the conduits 36. The quadrilateral configurations of the conduits 36 may be established by respective vanes 37 (FIG. 3). The vanes 37 separate the conduits 36 from each other. An example of how a square plume shape may be generated in accordance with the present disclosure is described below in connection with Example 2.

According to a preferred embodiment, high vorticity and high flow velocity may be achieved without creating a high amount of turbulence within the device 10. If desired, flow conditions through the device 10 may be near laminar.

If desired, the main component 12 may have a cylindrical outer surface 48 which is axially symmetrical about the flow axis 26. If desired, the receptor 24 and the gas flow housing 34 are integrally formed together in one piece. Indeed, all of the main component 12, including the receptor 24 and the gas flow housing 34 (including the rear surface 38, the front surface 44, and the outer surface 48 of the flow housing 34), and including all that defines the gas-contacting surfaces of the vanes 37 and the flow conduits 36 within the housing 34, may be in the form of a single piece of material. The single-piece component 12 may be formed by a suitable process such as, for example, a 3D printing process or a lost-wax casting process. The single piece of material may include a suitable polymer, ceramic or metal material.

The connection component 14 includes a first female connection portion 70, a frustoconical portion 72, and a second female connection portion 74. The illustrated first female connection portion 70 is cylindrical and receives a cylindrical male connection portion 76 of the main component 12. A hermetic, secure connection 78 is formed between the first female connection portion 70 and the male connection portion 76. The connection 78 may be established by press fit, e-beam welding, suitable mating threads, or an adhesive located between the connection portions 70, 76. If desired, an annular shoulder 80 of the frustoconical portion 72 may be entirely coplanar with the front plane 32 of the main component 12, and abut tightly against the gas flow housing 34.

An inner frustoconical surface 82 of the frustoconical portion 72 defines a funnel-shaped flow volume 84 downstream from the gas outlets 46 and the liquid orifice 20. In operation, the gas and dispersed droplets and ligaments of the liquid constitute a high helicity swirling mixture which flows from the funnel-shaped volume 84 into the nozzle component 16. As discussed in more detail below, most of the liquid stream from the orifice 20 is broken up into droplets and ligaments before the liquid reaches the pedestal 22. The gap between the fluid metering device orifice 20 and the surface of the pedestal 22 may be, if desired, in the range of from about 1.5 mm to about 1.75 mm, or in the range of from 1.5 mm to 1.75 mm. If desired, the funnel-shaped flow volume 84 is axially symmetric around the flow axis 26.

The second female connection portion 74 is cylindrical, surrounds a cylindrical outer portion 94 of the nozzle component 16, and is axially symmetrical about the flow axis 26. An annular shoulder 88 depends inwardly from the second female connection portion 74, and abuts a corresponding annular shoulder 90 of the nozzle component 16. The second female connection portion 74 is hermetically, securely connected to the nozzle component 16 by an interface 92 between the connection portion 74 and the illustrated outer portion 94 of the nozzle component 16. The interface 92 may include press fit, e-beam welding, suitable threads, or an adhesive (not illustrated).

All of the connection component 14, including the female connection portions 70, 74 and the frustoconical portion 72, is preferably in the form of a single piece of material. The single-piece component 14 may be formed by any suitable process such as, for example, a 3D printing process or a lost-wax casting process. The single piece of material may include the same material used to make the main component 12.

Inside the nozzle component 16, the upstream end of the pedestal 22 has a conical shape which points toward the liquid orifice 20. The liquid which impinges on the surface of the conical end of the pedestal 22 may tend to form a thin film which spreads out across the conical surface in a downstream direction—the thin film reaches the outer fine edge 23 of the pedestal 22 to further interact with the high helicity gas thus shearing the thin film and ligaments into finer droplets.

The outer fine edge 23 may be circular and perpendicular to the flow axis 26. The pedestal 22 may be aligned with the flow axis 26 and is located downstream from the liquid orifice 20 a sufficient distance so as to not be located within the funnel-shaped flow volume 84. In operation, most of the liquid stream issuing from the orifice 20 is dispersed into droplets and ligaments by swirling gas within the funnel-shaped flow volume 84 before the liquid can reach the pedestal 22.

The illustrated configuration has a number of advantages related to the formation of the thin film on the conical surface of the pedestal 22. By breaking up most of the liquid before it reaches the pedestal 22, the thickness of the thin film is reduced and the residence time of small particles at a sharp circular edge 23 of the conical surface is reduced which in effect causes smaller particles to enter an annular flow volume 96. The sharp edge 23 of the conical surface is an outer fine edge 23 of the pedestal 22, where the conical surface of the pedestal 22 meets the cylindrical surface of the pedestal 22 which is within the annular flow volume 96.

In operation, the gas-liquid mixture and a remaining small amount of the liquid stream are directed by the pedestal 22 into the annular flow volume 96, and from there into an array of small nozzle openings 98. The annular flow volume 96 may be defined, at least in part, by an outer cylindrical surface of the pedestal 22. The cross-sectional area of the annular flow volume 96, perpendicular to the flow axis 26, is less than that of the funnel-shaped flow volume 84.

As a result of this difference, the swirling gas and liquid accelerate from right to left (as viewed in FIG. 2) in the direction of the flow axis 26 as they flow into the annular flow volume 96. The acceleration of the gas and liquid into the annular flow volume 96 causes further break up of droplets and ligaments and disperses the liquid into smaller droplets. Since the flow volume 96 is annular, the high-energy swirling motion of the gas-liquid mixture is not directly impeded until the mixture reaches the nozzle openings 98.

There may be two, three, four, or more of the nozzle openings 98. The total cross-sectional area of the array of nozzle openings 98, perpendicular to the flow axis 26, is less than that of the annular flow volume 96. Therefore, the gas and liquid droplets accelerate from right to left, as viewed in FIG. 2, in directions aligned with the nozzle openings 98 as the mixture flows into the nozzle openings 98. The acceleration of the mixture and the change from a swirling motion to a high-velocity flow in the axial directions of the nozzle openings 98 cause the droplets in the mixture to be broken up into even smaller droplets before they are sprayed or ejected out of the openings 98 to form a plume (not illustrated) downstream from the nozzle component 16.

The gas-liquid plume preferably contains only ultra-fine particles of liquid homogeneously distributed, with a normalized distribution, within the gas. The plume may be ejected at sonic speeds to attain a critical Weber number to facilitate final breakup of particles to even smaller particles. The plume geometry may be, for example, round, oval, rectangular, square, or triangular.

All of the nozzle component 16, including the pedestal 22, the outer portion 94, and the parts which define the small nozzle openings 98, is preferably in the form of a single piece of material. Like the other components 12, 14, the single-piece nozzle component 16 may be formed by any suitable process such as, for example, a 3D printing process or a lost-wax casting process. If desired, the nozzle component 16 may be machined from a single piece of material.

The single piece of material may include the same material used to make the main component 12. On the other hand, if desired, the nozzle component 16 may be formed of a material that is more durable and wear-resistant than that of the other components 12, 14 so that the nozzle component 16 can withstand flow impingement and higher flow velocities without undue wear or erosion.

The flow device 10 may be assembled in a two-step process, as follows: First, the nozzle component 16 is fitted into the connection component 14 by moving the shoulder 90 of the nozzle component 16 into contact with the inwardly depending shoulder 88 of the connection component 14. To complete this first step, the nozzle component 16 moves into the connection component 14 from right to left, as viewed in FIG. 2, and/or the connection component 14 moves over the nozzle component 16 from left to right, as viewed in FIG. 2. A press fit, e-beam welding, suitable threads, or adhesive connection is then established at the interface 92 between the two components 14, 16.

An advantage of the illustrated configuration is that other nozzle components (not illustrated) like the one illustrated in FIGS. 1 and 2 but with different arrays of small nozzle openings may be easily connected to the connection component 14. It is not necessary to produce connection components having different configurations to connect selectively to different nozzle components. At the same time, the ability to reliably abut the nozzle component shoulder 90 on the inwardly depending shoulder 88 of the connection component 14 ensures that the two components 14, 16 are accurately positioned relative to each other, and provides added safety against the nozzle component 16 being ejected from the connection component 14 in the event of an unexpected failure at the interface 92.

In the second step of the two-step assembly process, performed after the first step, the main component 12 is fitted into the connection component 14 by moving the front surface 44 into contact with the rearwardly facing annular shoulder 80 of the connection component 14. To complete this second step, the main component 12 moves into the connection component 14 from right to left as viewed in FIG. 2 and/or the connection component 14 moves over the main component 12 from left to right as viewed in FIG. 2. The press fit, e-beam welding, suitable threads, or adhesive connection 78 is then established between the two components 12, 14.

An advantage of the illustrated configuration is that other main components (not illustrated) generally like the one illustrated in FIGS. 1-3 but with different helical (corkscrew-shaped) conduits may be easily connected to the connection component 14 (and thereby to the nozzle component 16). It is not necessary to produce connection components having different configurations to connect selectively to different main components. Indeed, the illustrated three-component configuration makes it possible to efficiently and flexibly "program" a device to establish a desired gas-liquid plume geometry with desired input conditions for the gas and liquid, by using the connection component 14 to connect an appropriate main component to an appropriate nozzle component, without having to reconfigure or make a different connection component.

In operation, gas flows into the openings 42 and through the helical conduits 36, under suitable pressure and temperature conditions, and swirls with high vorticity around the flow axis 26 within the funnel-shaped volume 84. At the same time, a stream of liquid flows, under suitable pressure, temperature, and viscosity conditions, through the orifice 20 and into the funnel-shaped volume 84. Most of the liquid is broken up into droplets and ligaments by the gas swirling within the funnel-shaped volume 84 before the liquid reaches the pedestal 22. The remainder of the liquid impinges and forms a thin film on the conical surface of the pedestal 22. Upstream from the orifice 20, the liquid flow may be pressurized or on-off controlled by the liquid metering device 18 and/or other devices (not illustrated).

Subsequently, the droplets and the ligaments, the remainder of the liquid, and the gas accelerate from the funnel-shaped volume 84 and into the annular flow volume 96, and thereby form smaller droplets entrained within the swirling gas. Subsequently, a mixture of the gas and the smaller droplets accelerates from the annular flow volume 96 and into the nozzle openings 98, and thereby forms a gas-liquid plume downstream from the nozzle openings 98.

In operation, smaller droplets are formed as the first droplets, the ligaments, the remainder of the liquid, and the gas enter the annular flow volume 96 and swirl around the pedestal 22. As the mixture of the gas and the smaller droplets accelerate into the nozzle openings 98, the flow direction of the mixture changes from a swirling direction (around the pedestal 22) to directions axially aligned with the nozzle openings 98, which contributes to the dispersion of the liquid into fine (very small) droplets.

In summary, the illustrated device 10 includes a main component 12 including helical conduits 36, and receiving a liquid orifice 20, a connection component 14 having a funnel-shaped volume 84, and a nozzle component 16 including a pedestal 22. An annular flow volume 96 is defined by the pedestal 22, and nozzle openings 98 are located downstream from the annular flow volume 96. The helical conduits 36 provide paths for the gas to flow within the main component 12, and cause the gas to swirl within the funnel-shaped volume 84.

As illustrated by way of example in FIG. 3, at least the inlet openings 42 of the helical conduits 36 have quadrilateral (not circular) cross-sections to permit more of the gas to flow into and through the main component 12 than would be the case if the conduits had circular cross-sections. The non-linearity of the conduits 36 needed to establish the desired swirling motion within the connection component 14 may create a pressure drop along the lengths of the conduits 36 that would not occur if the conduits were linear.

The pressure drop, by itself, could reduce the amount (mass) of gas that can flow through the conduits 36 for a given pressure at the upstream openings 42. Increasing the cross-sectional area of the conduits 36 by providing them with the desired quadrilateral (not circular) cross-sectional area, defined by the illustrated vanes 37, may be used to compensate for the increased pressure drop by increasing the amount of gas that flows into and though the conduits 36.

A method of assembling the device 10 has also been described. The method includes the steps of, first, connecting the nozzle component 16 (FIG. 2) to the connection component 14 and, subsequently, connecting the main component 12 to the connection component 14. In the first step, the connection portion 94 of the nozzle component 16 is located within the corresponding portion 74 of the connection component 14 to establish the desired connection between the nozzle and connection components 16, 14.

Then, in the second step, the connection portion 76 of the main component 12 is located within the corresponding portion 70 of the connection component 14 to establish the desired connection 78 between the main and connection components 12, 14. The connection portion 76 of the main component 12 preferably fits within the corresponding portion 70 of the connection component 14, not the other way around, so that the downstream outlets 46 of the gas conduits 36 are defined entirely by the gas flow housing 34 of the main component 12, not even partially by the connection component 14, to improve the programmability of the three-component device 10.

According to another aspect of the present disclosure, if desired, the nozzle component 16 and the connection component 14 may be fabricated together as one piece, that is, as an integral, one-piece component. According to another aspect of the present disclosure, if desired, all three components 16, 14, 12 may be fabricated together as one piece, that is, as an integral, one-piece component.

Example 1

Figure 4:
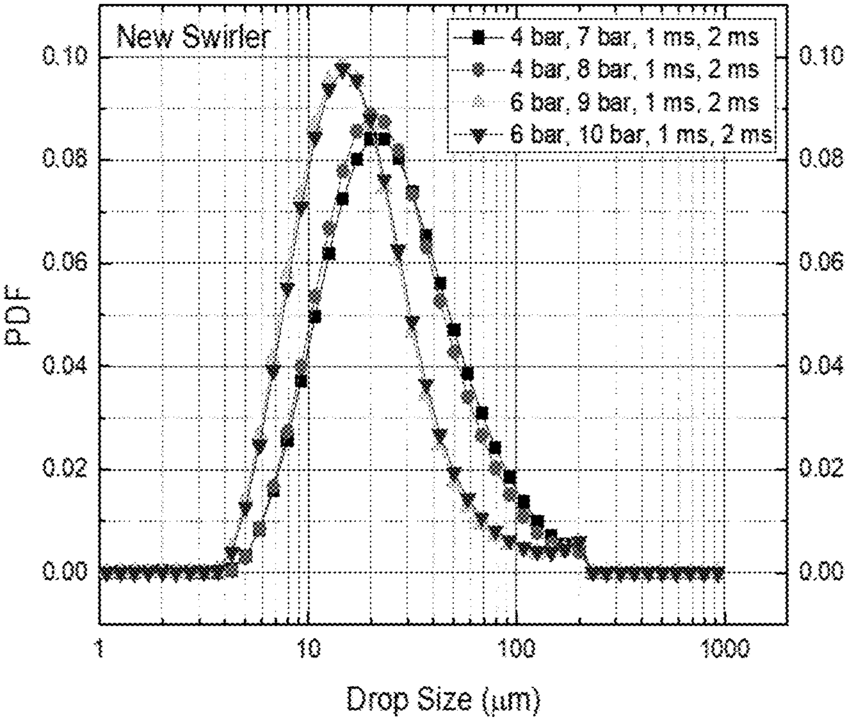
FIGS. 4 and 5 are graphs of probability density function (PDF) in relation to droplet size, showing the results of tests performed on examples of flow devices constructed in accordance with the present disclosure.
Figure 5:
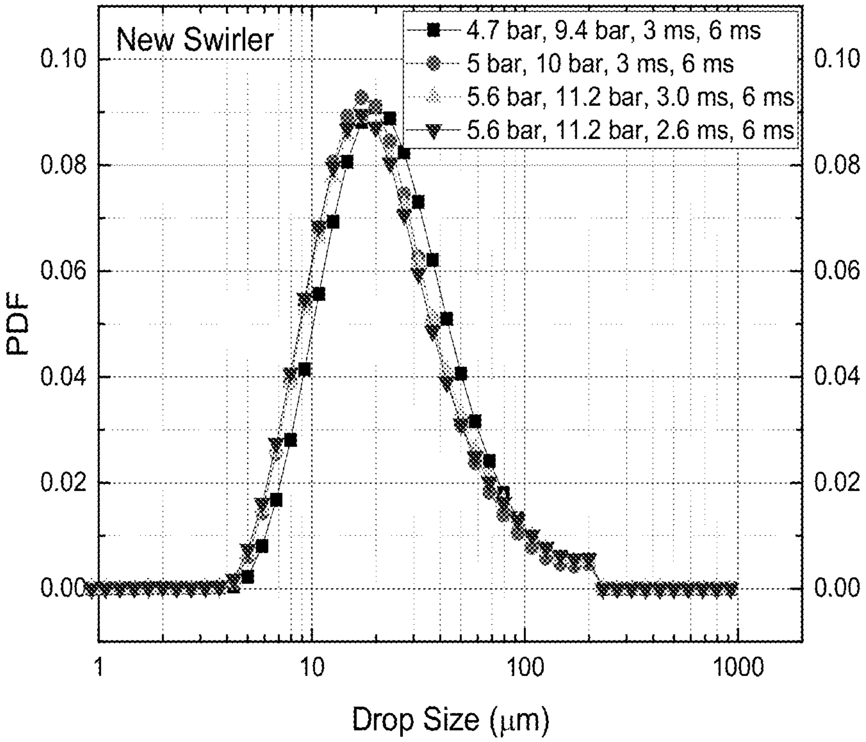
Figure 6:
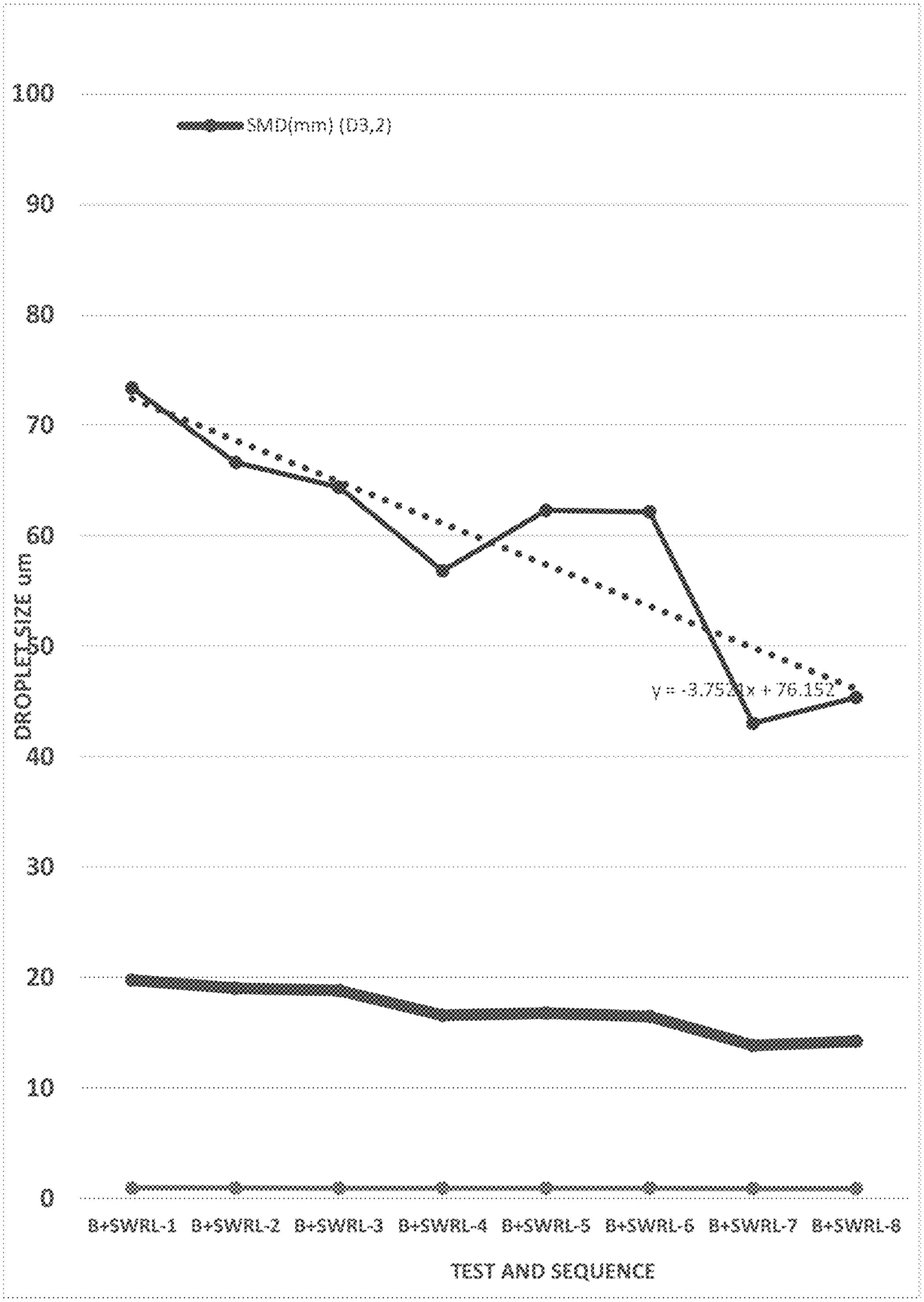
FIG. 6 shows droplet size test results for examples of flow devices constructed in accordance with the present disclosure.

Flow tests were performed on devices constructed in accordance with the present disclosure. The tests were performed according to protocols established by, and using analytical equipment marketed by, Malvern Panalytical Ltd. The flow tests/devices were labeled B+Swirl-1, B+Swirl-2, B+Swirl-3, B+Swirl-4, B+Swirl-5, B+Swirl-6, B+Swirl-7, and B+Swirl-8. The conditions under which the tests were performed are listed in Table 1 (below). The results of the tests are listed in Table 2 (below) and are shown in FIGS. 4-6.

TABLE 1

| Test | Air Pres. (bar) | Fluid Pres. (bar) | Air Pre. (msec) | Air Post (msec) |
|---|---|---|---|---|
| B + SWRL-1 | 4 | 7 | 1 | 2 |
| B + SWRL-2 | 4 | 8 | 1 | 2 |
| B + SWRL-3 | 4.7 | 0.94 | 3 | 6 |
| B + SWRL-4 | 5 | 10 | 3 | 6 |
| B + SWRL-5 | 5.6 | 11.2 | 2.6 | 6 |
| B + SWRL-6 | 5.6 | 11.2 | 3 | 6 |
| B + SWRL-7 | 6 | 9 | 1 | 2 |
| B + SWRL-8 | 6 | 10 | 1 | 2 |

TABLE 2

| Test | Malvern SMD (μm) | Scaled SMD (μm) (D3, 2) | D10 (μm) | D50 (μm) | D90 (μm) | StdDev (PDF) | Transmittance (%) |
|---|---|---|---|---|---|---|---|
| B + SWRL-1 | 20.58 | 19.79 | 11.09 | 26.01 | 73.37 | 1.00 | 22.89 |
| B + SWRL-2 | 19.94 | 19.07 | 10.90 | 24.60 | 66.63 | 0.99 | 23.39 |
| B + SWRL-3 | 20.01 | 18.85 | 10.86 | 24.02 | 64.40 | 0.97 | 15.07 |
| B + SWRL-4 | 17.62 | 16.60 | 9.62 | 20.98 | 56.84 | 0.97 | 18.87 |
| B + SWRL-5 | 17.92 | 16.81 | 9.57 | 21.42 | 62.31 | 0.97 | 16.34 |
| B + SWRL-6 | 17.56 | 16.50 | 9.41 | 20.94 | 62.17 | 0.97 | 17.02 |
| B + SWRL-7 | 15.07 | 13.89 | 8.20 | 17.09 | 43.04 | 0.94 | 16.37 |
| B + SWRL-8 | 15.41 | 14.26 | 8.39 | 17.61 | 45.37 | 0.95 | 16.58 |

FIGS. 4 and 5 show probability density function (PDF) data in relation to droplet size as measured in each of the eight tests. The tests established that the density of the spray plumes generated by the flow devices can be within a desirable, or at least adequate, range under all of the test conditions.

FIG. 6 shows droplet size distribution data obtained from each of the eight tests. The uppermost line of data runs through D90 droplet size data, where 90% of the droplets in the plume for each test had no more than the indicated droplet size. The other line of data in FIG. 6 runs through surface area mean (Sauter mean diameter) D(3,2) droplet size data from the respective tests. The linearity of the lines of data shown in FIG. 6 demonstrates that the flow devices can be tuned to meet desired performance characteristics. Moreover, the values shown in FIG. 6 for tests B+SWRL-7 and B+SWRL-8 demonstrate that a flow device constructed in accordance with the present disclosure can be tuned, if desired, to meet especially desirable performance characteristics.

Example 2

Figure 7:
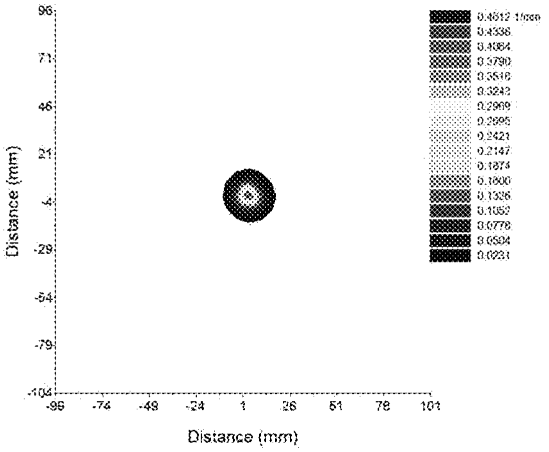
FIGS. 7-9 show patternation data for plumes generated by examples of flow devices constructed in accordance with the present disclosure.
Figure 8:
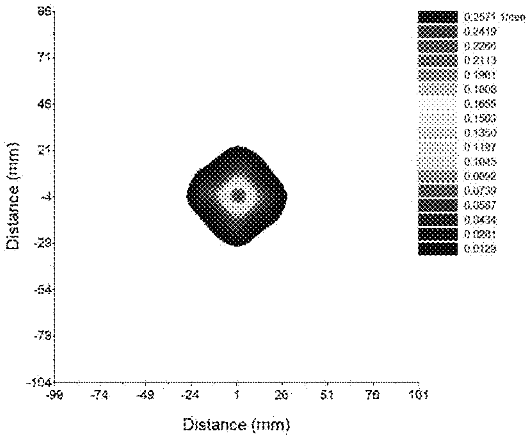
Figure 9:
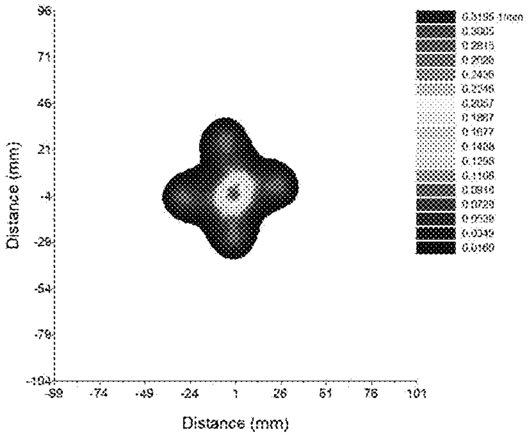

FIGS. 7-9 show patternation data for plumes generated by examples of flow devices constructed in accordance with the present disclosure. The data were obtained by droplet sizing measurements performed according to protocols established by, and using analytical equipment marketed by, Malvern Panalytical Ltd.

In the test reported in FIG. 7, the contour plot of the plume had an inner bullseye-shaped region where the average droplet spacing was about 0.4064 droplets/μm, a first annular region surrounding the bullseye-shaped region where the average droplet spacing was about 0.2969 droplets/μm, a second annular region surrounding the first annular region where the average droplet spacing was about 0.1326 droplets/μm, and an outermost annular region where the average droplet spacing was about 0.0231 droplets/μm. In the test reported in FIG. 7, the air pressure was 4.0 bar, the fluid pressure was 7.0 bar, the air pre. was 1 msec, and the air post was 1 msec.

In FIGS. 7-9, the illustrated units "mm" (micrometers) are μm (microns). And as used herein, the word "about" means within a range of plus or minus 10% of the indicated amount. For example, "about 100 units" means "within a range of from 90 units to 110 units."

The test reported in FIG. 7 generated a round spray plume with an acceptable uniformity, and an acceptably even distribution. The corresponding device and conditions may be used, if desired, to spray a round, multi-fluid plume onto a circular face of a cylindrical catalyst product, with excellent uniformity.

In the test reported in FIG. 8, the contour plot of the plume had an inner bullseye-shaped region where the average droplet spacing was about 0.4064 droplets/μm, a first annular region surrounding the bullseye-shaped region where the average droplet spacing was about 0.2969 droplets/μm, and a second region surrounding the first annular region where the average droplet spacing was about 0.1326 droplets/μm. The second region was biaxially symmetrical and not round. The contour plot also had an outermost square region where the average droplet spacing was about 0.0231 droplets/μm. In the test reported in FIG. 8, the air pressure was 4.0 bar, the fluid pressure was 7.0 bar, the air pre. was 1 msec, and the air post was 2 msec.

The test reported in FIG. 8 generated a spray plume with a square geometry, with an acceptable uniformity, and an acceptably even distribution. The corresponding device and conditions may be used, if desired, to spray a square, multi-fluid plume onto a square face of a rectangular parallelepiped catalyst product, with excellent uniformity.

In the test reported in FIG. 9, the contour plot of the plume had an inner bullseye-shaped region where the average droplet spacing was about 0.4064 droplets/μm, a first annular region surrounding the bullseye-shaped region where the average droplet spacing was about 0.2969 droplets/μm, and a second region surrounding the first annular region where the average droplet spacing was about 0.1326 droplets/μm.

The second region of the plume represented in FIG. 9 was biaxially symmetrical and not round. The contour plot also had an outermost region which was biaxially symmetrical and not round, where the average droplet spacing was about 0.0231 droplets/μm. In the test reported in FIG. 9, the air pressure was 4.0 bar, the fluid pressure was 7.0 bar, the air pre. was 1 msec, and the air post was 2 msec. The less-dense portions of the plume represented in FIG. 9 form four outwardly extending, biaxially symmetrical lobes surrounding a more dense, circular core. The present disclosure is not limited to the examples shown and described herein.

What is claimed as new and desired to be protected by Letters Patent is:

1. A method of using a device to form a gas-liquid plume, the method comprising:

causing a gas to flow through helical conduits within a main component of the device, and thereby causing the gas to swirl within a funnel-shaped volume of a connection component of the device, the main component being connected to the connection component;

causing a stream of liquid to flow along a flow axis, through a metering device outputting the liquid through an orifice into the funnel-shaped volume such that most of the liquid is broken up into first droplets and ligaments by the swirling gas within the funnel-shaped volume before the liquid reaches a pedestal, and such that a remainder of the liquid impinges on the pedestal;

wherein the pedestal is located within a nozzle component of the device, wherein the pedestal defines an annular flow volume within the nozzle component, and wherein the nozzle component is connected to the connection component; and wherein the method further includes causing the droplets and the ligaments, the remainder of the liquid, and the gas to accelerate from the funnel-shaped volume and into the annular flow volume, and thereby form smaller droplets; and causing a mixture of the gas and the smaller droplets to accelerate from the annular flow volume and into nozzle openings within the nozzle component, and thereby form the gas-liquid plume downstream from the nozzle openings.

2. The method of claim 1, wherein the step of causing the gas to swirl within the funnel-shaped volume is performed during the step of causing the stream of liquid to flow into the funnel-shaped volume.

3. The method of claim 2, wherein the smaller droplets are formed by causing the first droplets, the ligaments, the remainder of the liquid, and the gas to enter the annular flow volume and swirl around the pedestal within the annular flow volume.

4. The method of claim 3, wherein a flow direction of the mixture of the gas and the smaller droplets changes, from a swirling direction to directions aligned with the nozzle openings, during the step of causing the mixture of the gas and the smaller droplets to accelerate into the nozzle openings.

5. The method of claim 4, wherein the funnel-shaped volume has a cross-sectional area perpendicular to the flow axis, wherein the annular flow volume has a cross-sectional area perpendicular to the flow axis, and wherein the cross-sectional area of the annular flow volume is less than the cross-sectional area of the funnel-shaped volume.

6. The method of claim 5, wherein the nozzle openings have a cross-sectional area perpendicular to the flow axis, and wherein the cross-sectional area of the nozzle openings is less than the cross-sectional area of the annular flow volume.

7. The method of claim 1, wherein the helical conduits have quadrilateral cross-sections to permit more of the gas to flow through the main component of the device.

8. The method of claim 1, wherein the pedestal has a conical surface facing the stream of liquid.

9. The method of claim 1, further comprising:

wherein the pedestal is located downstream from the orifice a distance such that the pedestal is not within the funnel-shaped volume.

10. The method of claim 1, wherein:

the funnel-shaped volume comprises an annular surface configured to cause the swirling gas to break up the liquid before the liquid reaches the pedestal.

11. The method of claim 10, wherein:

the annular surface is radiused to cause the swirling gas to break up the liquid before the liquid reaches the pedestal.

12. The method of claim 10, wherein:

the annular surface is parabolic with respect to the flow axis to cause the swirling gas to break up the liquid before the liquid reaches the pedestal.

13. A method of using a device to form a gas-liquid plume, the method comprising:

causing a gas to flow through helical conduits within a main component of the device, and thereby causing the gas to swirl within a radiused funnel-shaped volume of a connection component of the device, the main component being connected to the connection component;

causing a stream of liquid to flow into the funnel-shaped volume such that most of the liquid is broken up into first droplets and ligaments by the gas within the funnel-shaped volume, and such that a remainder of the liquid impinges on a pedestal;

wherein the pedestal is located within a nozzle component of the device, wherein the pedestal defines an annular flow volume within the nozzle component, and wherein the nozzle component is connected to the connection component; and wherein the method further includes causing the droplets and the ligaments, the remainder of the liquid, and the gas to accelerate from the funnel-shaped volume and into the annular flow volume, and thereby form smaller droplets; and causing a mixture of the gas and the smaller droplets to accelerate from the annular flow volume and into nozzle openings within the nozzle component, and thereby form the gas-liquid plume downstream from the nozzle openings.

* * * * *